(12) United States Patent
Matsunami et al.

(10) Patent No.: US 11,422,049 B2
(45) Date of Patent: Aug. 23, 2022

(54) SENSOR DEVICE CONFIGURED TO REDUCE OUTPUT ERRORS DUE TO TEMPERATURE CHARACTERISTICS

(71) Applicant: FUJI ELECTRIC CO., LTD., Kanagawa (JP)

(72) Inventors: Kazuhiro Matsunami, Matsumoto (JP); Mutsuo Nishikawa, Matsumoto (JP); Ryohei Uzawa, Matsumoto (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 276 days.

(21) Appl. No.: 16/794,231

(22) Filed: Feb. 19, 2020

(65) Prior Publication Data
US 2020/0182725 A1    Jun. 11, 2020

Related U.S. Application Data

(63) Continuation of application No. PCT/JP2019/002673, filed on Jan. 28, 2019.

(30) Foreign Application Priority Data

Mar. 14, 2018 (JP) .............................. JP2018-046995

(51) Int. Cl.
*G01L 9/04* (2006.01)
*G01L 1/22* (2006.01)
*G01L 19/04* (2006.01)

(52) U.S. Cl.
CPC ................ *G01L 9/045* (2013.01); *G01L 1/22* (2013.01); *G01L 19/04* (2013.01)

(58) Field of Classification Search
None
See application file for complete search history.

(56) References Cited

U.S. PATENT DOCUMENTS 4,190,804 A    2/1980  Pyne
4,667,516 A *  5/1987  Schulz ................... G01L 9/065
                                                      323/367

(Continued)

FOREIGN PATENT DOCUMENTS

CN    201491346 U    5/2010
CN    105306056 A    2/2016

(Continued)

OTHER PUBLICATIONS

International Search Report and (ISA/237) Written Opinion of the International Search Authority for International Patent Application No. PCT/JP2019/002673, mailed by the Japan Patent Office dated Apr. 23, 2019.

(Continued)

*Primary Examiner* — Peter J Macchiarolo
*Assistant Examiner* — Jermaine L Jenkins (57) ABSTRACT

It is desired to further reduce output errors which are caused by temperature characteristics. A sensor device is provided which includes a sense circuit which outputs a sense signal according to a magnitude of a detected physical quantity, an amplifier circuit which amplifies the sense signal, and a switching unit which switches at least one of a sensitivity of the sense circuit and an offset of the amplifier circuit discontinuously according to whether a temperature measurement value exceeds a threshold value.

20 Claims, 8 Drawing Sheets

(56) References Cited

U.S. PATENT DOCUMENTS

| | | | |
|---|---|---|---|
| 5,197,334 A | 3/1993 | Guziak | |
| 5,343,755 A * | 9/1994 | Huss | G01B 7/18 |
| | | | 73/708 |
| 5,419,199 A | 5/1995 | Araki | |
| 6,154,087 A * | 11/2000 | Ito | G01D 3/0365 |
| | | | 327/362 |
| 7,073,389 B2 * | 7/2006 | Kurtz | G01L 27/007 |
| | | | 73/727 |
| 7,216,554 B2 * | 5/2007 | Morikawa | G01D 3/0365 |
| | | | 73/754 |
| 9,593,994 B2 * | 3/2017 | Nguyen | G01L 9/045 |
| 2002/0083776 A1 * | 7/2002 | Tanizawa | G01L 9/065 |
| | | | 73/753 |
| 2012/0293212 A1 | 11/2012 | Hanson | |
| 2014/0358317 A1 | 12/2014 | Nishikawa | |
| 2016/0209287 A1 | 7/2016 | Hirayama | |

FOREIGN PATENT DOCUMENTS

| | | |
|---|---|---|
| JP | H05256716 A | 10/1993 |
| JP | H08145715 A | 6/1996 |
| JP | 2000214030 A | 8/2000 |
| JP | 2003042870 A | 2/2003 |
| JP | 2006084201 A | 3/2006 |
| JP | 2012002742 A | 1/2012 |
| JP | 2014515506 A | 6/2014 |
| JP | 2015092149 A | 5/2015 |
| WO | 8806719 A1 | 9/1988 |
| WO | 2013100156 A1 | 7/2013 |

OTHER PUBLICATIONS

Notice of Third Office Action for Patent Application No. 201980004057.X, issued by the National Intellectual Property Administration of the People's Republic of China dated Dec. 22, 2021.

* cited by examiner

SENSOR DEVICE CONFIGURED TO REDUCE OUTPUT ERRORS DUE TO TEMPERATURE CHARACTERISTICS

The contents of the following Japanese patent application are incorporated herein by reference:
2018-046995 filed in JP on Mar. 14, 2018
PCT/JP2019/002673 filed on Jan. 28, 2019

BACKGROUND

1. Technical Field

The present invention relates to a sensor device.

2. Related Art

Conventionally, sensor devices that detect physical quantities reduce output errors due to temperature characteristics using various methods (for example, see Patent Literatures 1 to 4).

Patent Literature 1: Japanese Unexamined Patent Publication No. 2003-42870
Patent Literature 2: Japanese Unexamined Patent Publication No. 8-145715
Patent Literature 3: Japanese Unexamined Patent Publication No. 2006-84201
Patent Literature 4: WO 2013/100156

In recent years, it has been desired to further reduce output errors due to temperature characteristics.

SUMMARY

According to a first aspect of the present invention to solve the above problem, there is provided a sensor device. The sensor device may include a sense circuit which outputs a sense signal according to a magnitude of a detected physical quantity. The sensor device may include an amplifier circuit which amplifies the sense signal. The sensor device may include a switching unit which switches discontinuously at least one of a sensitivity of the sense circuit and an offset of the amplifier circuit according to whether a temperature measurement value exceeds a threshold value.

The amplifier circuit may include an offset voltage input terminal to adjust the offset. The switching unit may include an offset switching unit which switches a voltage to be supplied to the offset voltage input terminal.

The offset switching unit may include a variable resistor which is connected between the offset voltage input terminal and a reference potential. The offset switching unit may include a comparator which compares the temperature measurement value and the threshold value. The offset switching unit may switch a resistance value of the variable resistor according to a comparison result of the comparator.

The variable resistor may include a plurality of resistors which are connected in parallel between the offset voltage input terminal and the reference potential. The variable resistor may include a switch which blocks a current flowing to any of the plurality of resistors.

The offset switching unit may make the resistance value of the variable resistor lower in a case where the temperature measurement value exceeds the threshold value than in a case where the temperature measurement value does not exceed the threshold value.

The offset switching unit may make the voltage to be supplied to the offset voltage input terminal lower in a case where the temperature measurement value exceeds the threshold value than in a case where the temperature measurement value does not exceed the threshold value.

The sensor device may include an offset setting unit which sets a reference voltage to be supplied to the offset voltage input terminal. The offset switching unit may change the voltage to be supplied to the offset voltage input terminal from the reference voltage according to whether the temperature measurement value exceeds the threshold value.

The offset setting unit may include a temperature offset setting unit which sets the reference voltage according to a fixed setting parameter. The temperature offset setting unit may change the reference voltage continuously according to the temperature measurement value.

The sensitivity of the sense circuit may be adjustable according to a current supplied thereto. The switching unit may include a sensitivity switching unit which switches the current to be supplied to the sense circuit.

The sensitivity switching unit may include a current source which is connected to the sense circuit. The sensitivity switching unit may include a comparator which compares the temperature measurement value and the threshold value. The sensitivity switching unit may include a switch which blocks the current flowing between the current source and the sense circuit according to a comparison result of the comparator.

The sensitivity switching unit may make the current to be supplied to the sense circuit lower in a case where the temperature measurement value exceeds the threshold value than in a case where the temperature measurement value does not exceed the threshold value.

The sensor device may include a sensitivity setting unit which sets a reference current to be supplied to the sense circuit. The sensitivity switching unit may change the current to be supplied to the sense circuit from the reference current according to whether the temperature measurement value exceeds the threshold value.

The sensitivity setting unit may include a temperature sensitivity setting unit which sets the reference current according to a fixed setting parameter. The temperature sensitivity setting unit may change the reference current continuously according to the temperature measurement value.

The switching unit may switch at least one of the sensitivity and the offset in a stepped manner according to whether the temperature measurement value exceeds any of a plurality of threshold values.

The sensor device may further include a temperature sensor which measures a temperature of the sense circuit as a temperature measurement value.

The summary clause does not necessarily describe all necessary features of the embodiments of the present invention. The present invention may also be a sub-combination of the features described above.

DESCRIPTION OF EXEMPLARY EMBODIMENTS

Hereinbelow, the present invention will be described through embodiments of the invention, but the following embodiments do not limit the invention disclosed in claims. In addition, not all combinations of features described in the embodiments are essential for the solution of the invention.

Figure 1:
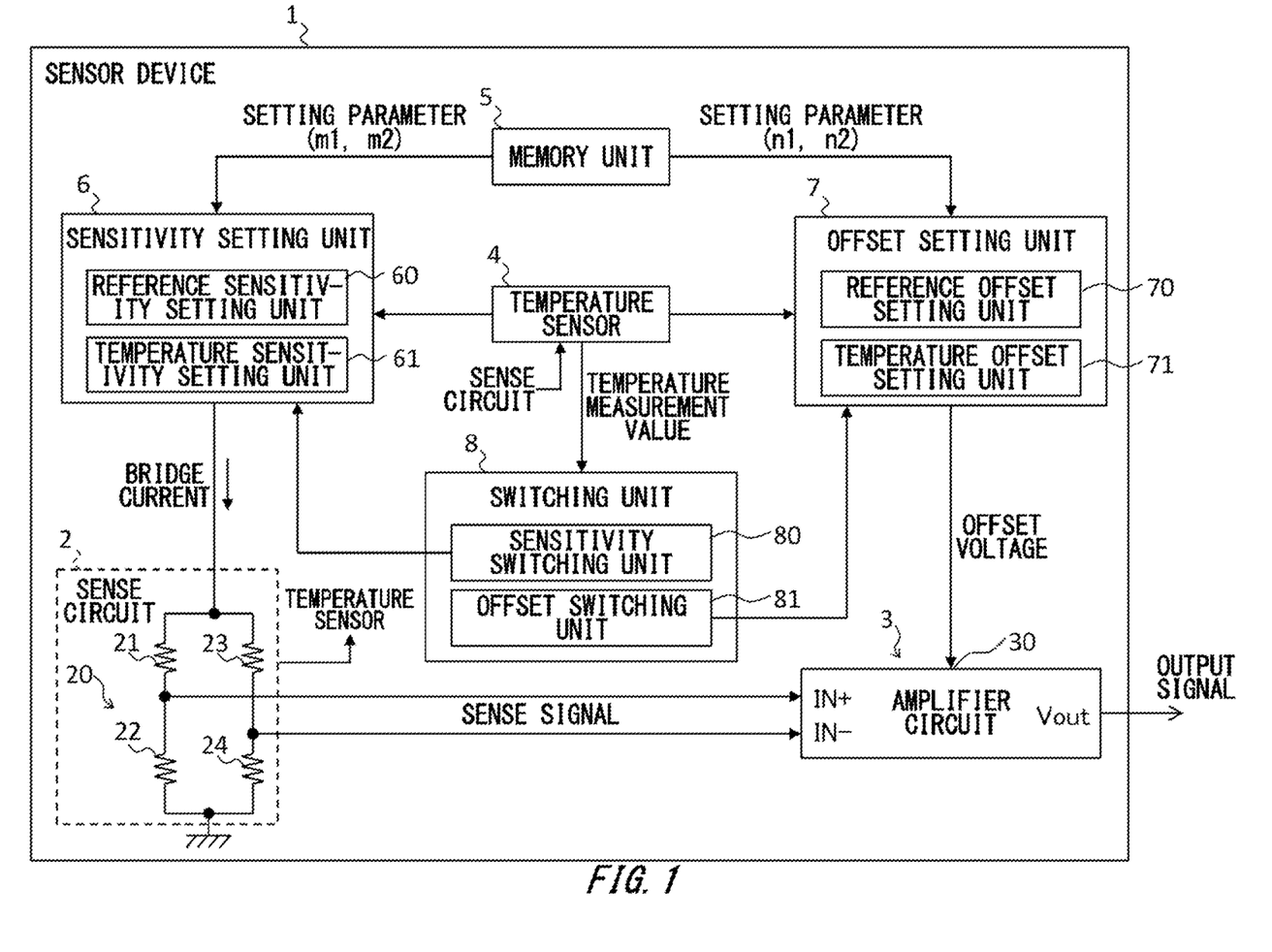
FIG. 1 shows a sensor device according to this embodiment.

[1. Sensor Device] FIG. 1 illustrates a sensor device 1 according to this embodiment. The sensor device 1 detects the magnitude of a physical quantity and outputs an output signal. In this embodiment, as an example, the magnitude of a pressure will be detected. In addition, the sensor device 1 in this embodiment switches temperature characteristics in a case where the temperature exceeds a threshold value (also referred to as a threshold temperature; for example, 100° C.). The sensor device 1 includes a sense circuit 2, an amplifier circuit 3, a temperature sensor 4, a memory unit 5, a sensitivity setting unit 6, an offset setting unit 7, and a switching unit 8.

[1-2. Sense Circuit] The sense circuit 2 outputs a sense signal according to the magnitude of the detected physical quantity (for example, a pressure in this embodiment). As an example in this embodiment, the sense circuit 2 includes a Wheatstone bridge 20 which includes four piezo resistors 21 to 24. The piezo resistors 21 to 24 may be disposed on a thin-film type of diaphragm (not illustrated), or may be disposed at an equal interval along the periphery of a circular diaphragm as an example. The piezo resistors 21 to 24 may change a resistance value according to a deformation of the diaphragm, and generate a potential difference in the output of the Wheatstone bridge 20. The sensitivity of the sense circuit 2 may be adjustable according to a current (also referred to as a bridge current) to be supplied. As an example in this embodiment, the sensitivity of the sense circuit 2 may be increased as the bridge current is increased. The sense circuit 2 may output a positive/negative sense signal indicating the potential difference according to the magnitude of a detected pressure to the amplifier circuit 3.

[1-3. Amplifier Circuit] The amplifier circuit 3 amplifies the sense signal. For example, the amplifier circuit 3 may amplify the potential difference of the sense signal. A gain of the amplifier circuit 3 may be a fixed value, or may be 300 times as an example. The amplifier circuit 3 may include an offset voltage input terminal 30 to adjust the offset, or may adjust the offset according to an offset voltage to be input. As an example in this embodiment, the offset of the amplifier circuit 3 may be increased as the offset voltage is increased. The amplifier circuit 3 may output the amplified sense signal to the outside as an output signal.

[1-4. Temperature Sensor] The temperature sensor 4 measures the temperature of the sense circuit 2 as a temperature measurement value. The temperature sensor 4 may supply a measurement result to the sensitivity setting unit 6, the offset setting unit 7, and the switching unit 8. In this embodiment, as an example, the temperature sensor 4 may supply a current according to the temperature measurement value.

[1-5. Memory Unit] The memory unit 5 stores one or more setting parameters to determine settings of the sensitivity setting unit 6 and/or the offset setting unit 7. For example, the memory unit 5 may store at least one setting parameter for each of the sensitivity setting unit 6 and the offset setting unit 7. In this embodiment, as an example, the memory unit 5 may store two setting parameters (m1) and (m2) described below with respect to the sensitivity setting unit 6, and may store two setting parameters (n1) and (n2) described below with respect to the offset setting unit 7. The value of each setting parameter may be preset at the time of manufacturing the sensor device 1. Instead, the memory unit 5 may store a plurality of values for each setting parameter, and a user may set any value to be used. The memory unit 5 may be an EPROM (Erasable Programmable Read Only Memory), or may be other memory devices.

[1-6. Sensitivity Setting Unit] The sensitivity setting unit 6 sets a reference current of the bridge current which is supplied to the sense circuit 2. The reference current is a current to be used as a reference. In this embodiment, as an example, the reference current is supplied to the sense circuit 2 in a case where the temperature measurement value is equal to or less than the threshold temperature described below. The sensitivity setting unit 6 may include a reference sensitivity setting unit 60 and/or a temperature sensitivity setting unit 61 to set the reference current. In a case where the sensitivity setting unit 6 includes both of the reference sensitivity setting unit 60 and the temperature sensitivity setting unit 61, the reference sensitivity setting unit 60 and the temperature sensitivity setting unit 61 may set the reference current in cooperation with each other.

The reference sensitivity setting unit 60 sets the reference current according to the fixed setting parameter (m1). The setting parameter (m1) may be set such that an error between a pressure indicated by the output signal of the sensor device 1 and an actual pressure falls within an allowable range. For example, the setting parameter (m1) may be set such that an error at a reference temperature (a room temperature as an example) falls within an allowable range. The setting parameter (m1) may be supplied from the memory unit 5.

The temperature sensitivity setting unit 61 sets the reference current according to the fixed setting parameter (m2), and continuously changes the reference current according to the temperature measurement value. The setting parameter (m2) may be set such that the temperature characteristics of the sensor device 1 is improved. For example, the setting parameter (m2) may be set such that an error falls within an allowable range over an operating temperature range of the sensor device 1. The setting parameter (m2) may be supplied from the memory unit 5.

[1-7. Offset Setting Unit] The offset setting unit 7 sets the reference voltage which is supplied to the offset voltage input terminal 30 of the amplifier circuit 3. The reference voltage is a voltage to be used as a reference. In this embodiment, as an example, the reference voltage is supplied to the sense circuit 2 in a case where the temperature measurement value is equal to or less than the threshold temperature described below. The offset setting unit 7 may include a reference offset setting unit 70 and/or a temperature offset setting unit 71 to set the reference voltage. In a case where the offset setting unit 7 includes both of the reference offset setting unit 70 and the temperature offset setting unit 71, the reference offset setting unit 70 and the temperature offset setting unit 71 may set the reference voltage in cooperation with each other.

The reference offset setting unit 70 sets the reference current according to the fixed setting parameter (n1). The setting parameter (n1) may be set such that an error between a pressure indicated by the output signal of the sensor device 1 and an actual pressure falls within an allowable range. For example, the setting parameter (n1) may be set such that an error at a reference temperature (a room temperature as an example) falls within an allowable range. The setting parameter (n1) may be supplied from the memory unit 5.

The temperature offset setting unit 71 sets the reference voltage according to the fixed setting parameter (n2), and continuously changes the reference voltage according to the temperature measurement value. The setting parameter (n2) may be set such that the temperature characteristics of the sensor device 1 is improved. For example, the setting parameter (n2) may be set such that an error falls within an allowable range over an operating temperature range of the sensor device 1. The setting parameter (m2) may be supplied from the memory unit 5.

[1-8. Switching Unit] The switching unit 8 switches at least one of the sensitivity of the sense circuit 2 and the offset of the amplifier circuit 3 discontinuously according to whether the temperature measurement value exceeds the threshold temperature. The discontinuous switching may a switching in which the sensitivity and the offset are discontinuously changed in response to the temperature change. The threshold temperature may be preset at the time of manufacturing the sensor device 1, and may be set by a user. The threshold temperature may be stored in the memory unit 5. The switching unit 8 may include a sensitivity switching unit 80 and an offset switching unit 81.

The sensitivity switching unit 80 switches the bridge current which is supplied to the sense circuit 2. For example, the sensitivity switching unit 80 may change the bridge current from the reference current according to whether the temperature measurement value exceeds the threshold temperature.

The offset switching unit 81 switches the voltage which is supplied to the offset voltage input terminal 30. For example, the offset switching unit 81 may change the voltage to be supplied to the offset voltage input terminal 30 from the reference voltage according to whether the temperature measurement value exceeds the threshold temperature.

According to the sensor device 1 described above, at least one of the sensitivity of the sense circuit 2 and the offset of the amplifier circuit 3 is switched discontinuously according to whether the temperature measurement value exceeds the threshold temperature. Therefore, since the temperature characteristics of the sensor device 1 can be switched with the threshold temperature as a boundary, an output error caused by the temperature characteristics can be reduced.

In addition, since the sensitivity switching unit 80 switches the bridge current of the sense circuit 2, the sensitivity of the sense circuit 2 is switched according to whether the temperature measurement value exceeds the threshold temperature. Therefore, the temperature characteristics of the sensor device 1 can be securely switched with the threshold temperature as a boundary.

In addition, since the offset switching unit 81 switches the offset voltage of the offset voltage input terminal 30, the offset of the amplifier circuit 3 is switched according to whether the temperature measurement value exceeds the threshold temperature. Therefore, the temperature characteristics of the sensor device 1 can be securely switched with the threshold temperature as a boundary.

In addition, since the sensitivity setting unit 6 sets the reference current of the bridge current, the sensitivity can be set to cancel a variation in characteristic. In addition, since the temperature sensitivity setting unit 61 changes the reference current continuously according to the temperature measurement value, the temperature characteristics of the sensitivity can be switched by each of the temperature sensitivity setting unit 61 and the sensitivity switching unit 80. Therefore, it is possible to further reduce the output error caused by the temperature characteristics.

In addition, since the offset setting unit 7 sets the reference voltage of the offset voltage, the offset can be set to cancel the variation in characteristic. In addition, since the temperature offset setting unit 71 changes the reference voltage continuously according to the temperature measurement value, the temperature characteristics of the offset can be switched by each of the temperature offset setting unit 71 and the offset switching unit 81. Therefore, it is possible to further reduce the output error due to the temperature characteristics.

Figure 2:
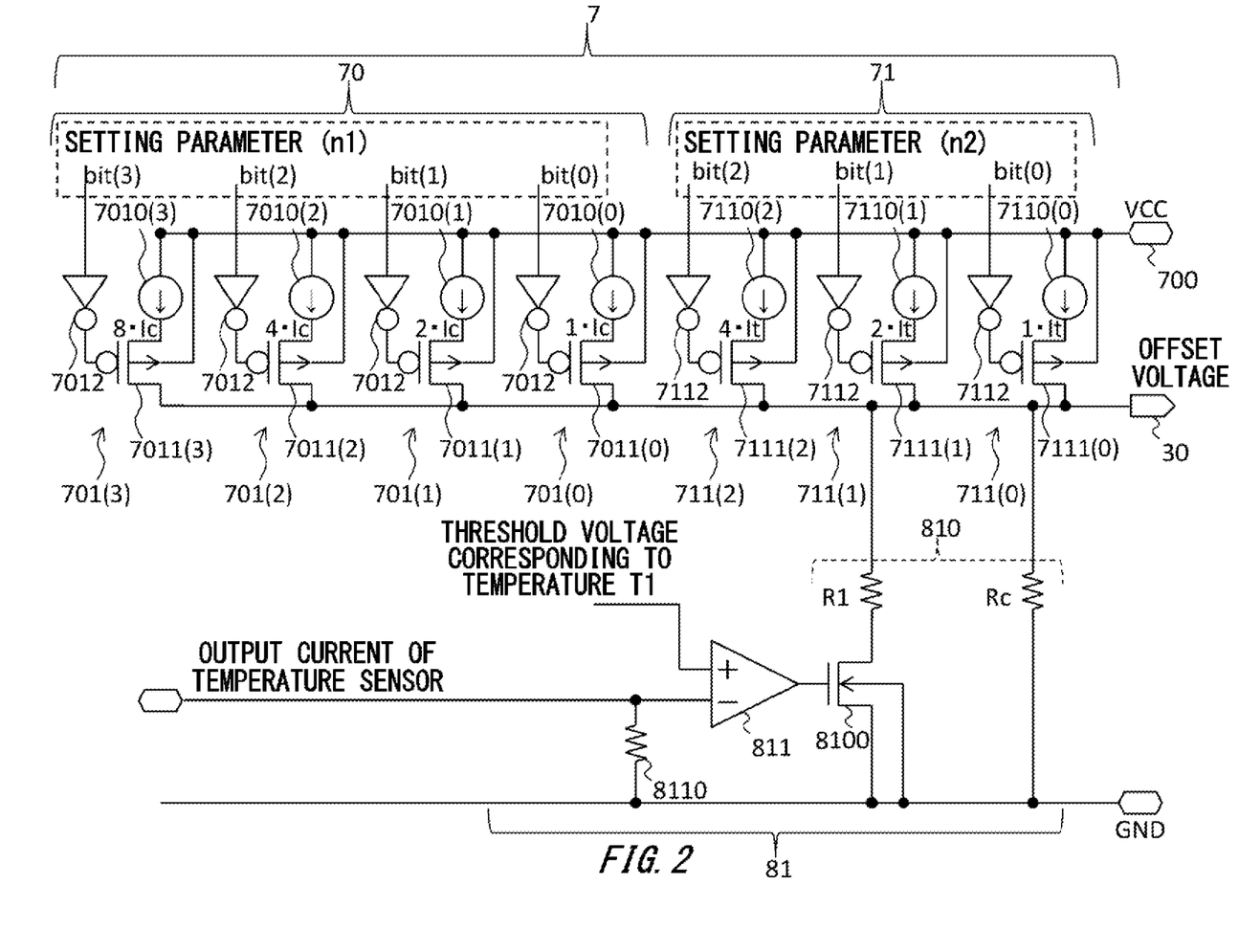
FIG. 2 shows an offset setting unit and an offset switching unit.

[2. Control of Offset] FIG. 2 illustrates the offset setting unit 7 and the offset switching unit 81. In this embodiment, as an example, the reference offset setting unit 70 and the temperature offset setting unit 71 of the offset setting unit 7 sets the reference voltage of the offset voltage to be supplied to the offset voltage input terminal 30. The offset switching unit 81 changes the offset voltage from the reference voltage according to whether the temperature measurement value exceeds a threshold temperature T1.

[2-1. Reference Offset Setting Unit] The reference offset setting unit 70 includes a power source 700, a plurality of current supply units 701 which are connected in parallel between the power source 700 and the offset voltage input terminal 30 (as an example of this embodiment, four current supply units 701(0) to 701(3)), and a resistor Rc which is connected between the offset voltage input terminal 30 and a reference potential (a ground potential in this embodiment), and generates a voltage at the resistor Rc according to a current to be supplied from the current supply unit 701 and supplies the voltage to the offset voltage input terminal 30. The power source 700 outputs a positive voltage such that the current to be supplied from the current supply unit 701 flows toward the offset voltage input terminal 30 and the ground.

The four current supply units 701(0) to 701(3) may output a current corresponding to the value of the setting parameter (n1) which is supplied from the memory unit 5. In this embodiment, as an example, the four current supply units 701(0) to 701(3) output a current n1·Ic obtained by multiplying the current Ic to the setting parameter (n1) represented by a value from 0 to 15. Herein, the current Ic may be a constant current regardless of a temperature change. As an example, IC may be a current obtained by increasing the offset voltage by about 5 mV.

Each of the current supply units 701(0) to 701(3) may include current sources 7010(0) to 7010(3) which are connected between the power source 700 and the offset voltage input terminal 30, and switches 7011(0) to 7011(3) which individually block the currents flowing from the current sources 7010(0) to 7010(3). The current sources 7010(0) to 7010(3) output the currents of 1×Ic, 2×Ic, 4×Ic, and 8×Ic. The switches 7011(0) to 7011(3) are opened or closed according to the value of the setting parameter (n1). For example, the switches 7011(0) to 7011(3) are respectively associated with the zeroth bit to the third bit of the setting parameter (n1) represented by four binary digits. The switches are opened when the values of corresponding bits are 0, and closed when the values of corresponding bits are 1. The switches 7011(0) to 7011(3) may be MOSFETs. A buffer circuit 7012 may be provided at each of the gates of the switches 7011(0) to 7011(3).

[2-2. Temperature Offset Setting Unit] The temperature offset setting unit 71 includes a plurality of current supply units 711 (three current supply units 711(0) to 711(2) as an example in this embodiment) which are connected in parallel between the power source 700 and the offset voltage input terminal 30, and generates a voltage corresponding to a current to be supplied from the current supply unit 711 using the resistor Rc and supplies the voltage to the offset voltage input terminal 30.

The three current supply units 711(0) to 711(2) may output currents corresponding to the value of the setting parameter (n2) to be supplied from the memory unit 5. In this embodiment, as an example, the three current supply units 711(0) to 711(2) output a current n2·It obtained by multiplying the current It to the setting parameter (n2) represented by a value from 0 to 7. Herein, the current It may be a current which changes along a temperature change and, for example, changes linearly according to a change of the temperature measurement value. With this configuration, the temperature offset setting unit 71 changes the reference voltage continuously according to the temperature measurement value.

Each of the current supply units 711(0) to 711(2) includes current sources 7110(0) to 7110(2) which are connected between the power source 700 and the offset voltage input terminal 30, and switches 7111(0) to 7111(2) which individually block the currents flowing from the current sources 7110(0) to 7110(2). The current sources 7110(0) to 7110(2) can change the output current linearly according to the temperature measurement value, and output the currents of 1×It, 2×It, and 4×It. The switches 7111(0) to 7111(2) are opened or closed according to the value of the setting parameter (n2). For example, the switches 7111(0) to 7111(2) are respectively associated with the zeroth bit to the second bit of the setting parameter (n2) represented by three binary digits. The switches are opened when the values of corresponding bits are 0, and closed when the values of corresponding bits are 1. The switches 7111(0) to 7111(2) may be MOSFETs. A buffer circuit 7112 may be provided at each of the gates of the switches 7111(0) to 7111(2).

[2-3. Offset Switching Unit] The offset switching unit 81 includes a variable resistor 810 which is connected between the offset voltage input terminal 30 and the ground, and a comparator 811 which compares the temperature measurement value and the threshold temperature T1.

The variable resistor 810 includes a plurality of resistors R (two resistors Rc and R1 as an example in this embodiment) which are connected in parallel between the offset voltage input terminal 30 and the ground, and a switch 8100 which blocks the current flowing to any of the resistors R (the resistor R1 in this embodiment). With this configuration, a resistance value of the variable resistor 810 becomes Rc in a case where the switch 8100 is opened, and becomes (Rc/R1)/(Rc+R1) in a case where the switch 8100 is closed. The resistance value (Rc/R1)/(Rc+R1) may be smaller than the resistance value Rc. Further, the resistor R is commonly configured in the reference offset setting unit 70 and the offset switching unit 81, but may be provided differently from each other. The switch 8100 may be opened or closed according to an output signal from the comparator 811. With this configuration, the resistance value of the variable resistor 810 is switched according to a comparison result of the comparator 811. The switch 8100 may be a MOSFET.

The comparator 811 may compare a voltage corresponding to the temperature measurement value and a voltage corresponding to the threshold temperature T1 (also referred to as a threshold voltage). For example, the voltage corresponding to the threshold temperature T1 may be input to a non-inverting input terminal of the comparator 811. A voltage corresponding to the output current of the temperature sensor 4 (as an example, a voltage generated by a resistor 8110 connected between the inverting input terminal and the ground) may be input to an inverting input terminal of the comparator 811. With this configuration, in a case where the temperature measurement value exceeds the threshold temperature T1, the switch 8100 is closed. In a case where the temperature measurement value does not exceed the threshold temperature T1, the switch 8100 is opened. As a result, in a case where the temperature measurement value exceeds the threshold temperature T1, the resistance value of the variable resistor 810 becomes smaller than that in a case where the temperature measurement value does not exceeds the threshold temperature T1. The offset voltage to be supplied to the offset voltage input terminal 30 becomes small, and the offset of the amplifier circuit 3 is lowered.

According to the offset switching unit 81 described above, in a case where the temperature measurement value exceeds the threshold temperature T1, the resistance value of the variable resistor 810, and also the offset voltage are set to small so as to switch the temperature characteristics of the offset.

Figure 3:
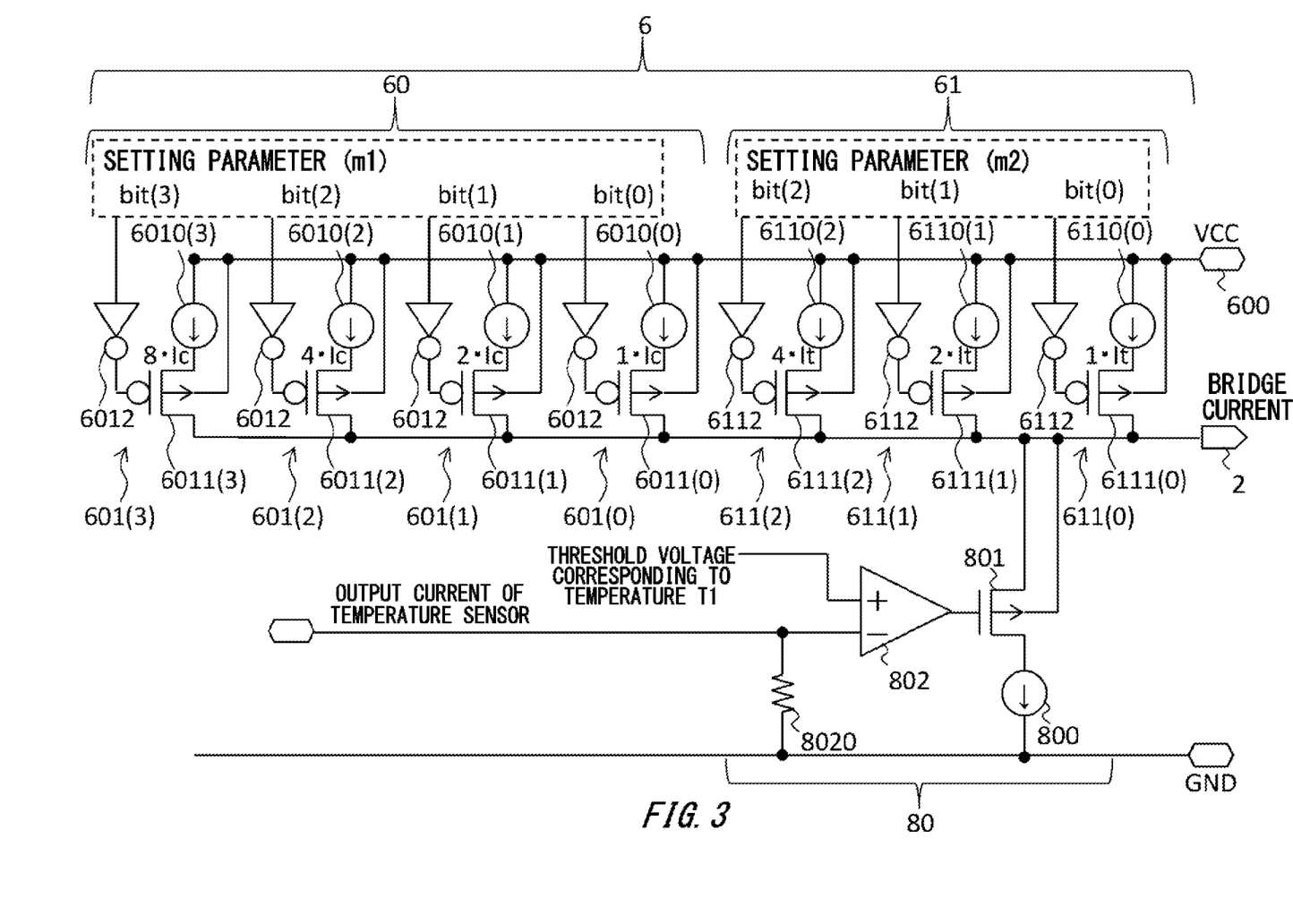
FIG. 3 shows a sensitivity setting unit and a sensitivity switching unit.

[3. Control of Sensitivity] FIG. 3 illustrates the sensitivity setting unit 6 and the sensitivity switching unit 80. In this embodiment, as an example, the reference sensitivity setting unit 60 and the temperature sensitivity setting unit 61 of the sensitivity setting unit 6 set the reference current of the bridge current of the sense circuit 2. The sensitivity switching unit 80 changes the bridge current from the reference current according to whether the temperature measurement value exceeds the threshold temperature T1.

[3-1. Reference Sensitivity Setting Unit] The reference sensitivity setting unit 60 includes a power source 600, and a plurality of current supply units 601 (four current supply units 601(0) to 601(3) as an example in this embodiment) which are connected in parallel between the power source 600 and the sense circuit 2, and supplies the current to be supplied from the current supply unit 601 to the sense circuit 2. The power source 600 outputs a positive voltage such that the current to be supplied from the current supply unit 601 flows toward the sense circuit 2.

The four current supply units 601(0) to 601(3) may output a current according to the value of setting parameter (m1) which is supplied from the memory unit 5. In this embodiment, as an example, the four current supply units 601(0) to 601(3) output a current m1·Ic obtained by multiplying the current Ic to the setting parameter (m1) represented by a value from 0 to 15. Further, the current Ic in the reference sensitivity setting unit 60 may be the same as the current Ic in the reference offset setting unit 70, or may be different.

Each of the current supply units 601(0) to 601(3) may include current sources 6010(0) to 6010(3) which are connected between the power source 600 and the sense circuit 2, and switches 6011(0) to 6011(3) which individually block the currents flowing from the current sources 6010(0) to 6010(3). The current sources 6010(0) to 6010(3) outputs the currents of 1×Ic, 2×Ic, 4×Ic, and 8×Ic. The switches 6011(0) to 6011(3) are opened or closed according to the value of the setting parameter (m1). For example, the switches 6011(0) to 6011(3) are respectively associated with the zeroth bit to the third bit of the setting parameter (m1) represented by four binary digits. The switches are opened when the values of corresponding bits are 0, and closed when the values of corresponding bits are 1. The switches 6011(0) to 6011(3) may be MOSFETs. A buffer circuit 6012 may be provided at each of the gates of the switches 6011(0) to 6011(3).

[3-2. Temperature Sensitivity Setting Unit] The temperature sensitivity setting unit 61 includes a plurality of current supply units 611 (three current supply units 611(0) to 611(2) as an example in this embodiment) which are connected in parallel between the power source 600 and the sense circuit 2, and supplies the current to be supplied from the current supply unit 611 to the sense circuit 2.

The three current supply units 611(0) to 611(2) may output a current according to the value of setting parameter (m2) which is supplied from the memory unit 5. In this embodiment, as an example, the three current supply units 611(0) to 611(2) output a current m2·It obtained by multiplying the current It to the setting parameter (m2) represented by a value from 0 to 7. With this configuration, the temperature sensitivity setting unit 61 changes the reference current continuously according to the temperature measurement value. Further, the current It in the temperature sensitivity setting unit 61 may be the same as the current It in the temperature offset setting unit 71, or may be different.

Each of the current supply units 611(0) to 611(2) includes current sources 6110(0) to 6110(2) which are connected between the power source 600 and the sense circuit 2, and the switches 6111(0) to 6111(2) which individually block the currents flowing from the current sources 6110(0) to 6110(2). The current sources 6110(0) to 6110(2) can change the output current linearly according to the temperature measurement value, and output the currents of 1×It, 2×It, and 4×It. The switches 6111(0) to 6111(2) are opened or closed according to the value of the setting parameter (m2). For example, the switches 6111(0) to 6111(2) are respectively associated with the zeroth bit to the second bit of the setting parameter (m2) represented by three binary digits. The switches are opened when the values of corresponding bits are 0, and closed when the values of corresponding bits are 1. The switches 6111(0) to 6111(2) may be MOSFETs. A buffer circuit 6112 may be provided at each of the gates of the switches 6111(0) to 6111(2).

[3-3. Sensitivity Switching Unit] The sensitivity switching unit 80 includes a current source 800 which is connected to the sense circuit 2, a switch 801 which blocks the current flowing between the current source 800 and the sense circuit 2, and a comparator 802 which compares the temperature measurement value and the threshold temperature T1.

The current source 800 may change the output current linearly according to the temperature measurement value, and output any of the currents of 1×It, 2×It, 3×It, and 4×It for example. The current source 800 may be a sink type, or may be connected between the sense circuit 2 and the ground. A switch 8000 is provided between the sense circuit 2 and the current source 800, and may be opened or closed according to an output signal from the comparator 802. With this configuration, the current source 800 is connected to the sense circuit 2 according to the comparison result of the comparator 802, and the bridge current is switched. Since the current source 800 is a sink type as an example in this embodiment, the bridge current may become small by the current drawn into the current source 800 in a case where the switch 8000 is closed compared to a case where the switch is opened. The switch 8000 may be a MOSFET.

The comparator 802 may compare a voltage corresponding to the temperature measurement value and a voltage corresponding to the threshold temperature T1. For example, the threshold voltage corresponding to the threshold temperature T1 may be input to a non-inverting input terminal of the comparator 802. A voltage (as an example, a voltage generated by a resistor 8020 connected between the inverting input terminal and the ground) corresponding to the output current of the temperature sensor 4 may be input to an inverting input terminal of the comparator 802. With this configuration, in a case where the temperature measurement value exceeds the threshold temperature T1, the switch 8000 is closed. In a case where the temperature measurement value does not exceed the threshold temperature T1, the switch 8000 is opened. As a result, in a case where the temperature measurement value exceeds the threshold temperature, the bridge current becomes smaller than that in a case where the value does not exceed the threshold temperature. The sensitivity of the sense circuit 2 is lowered. Further, the comparator 802 may be commonly configured in the sensitivity switching unit 80 and the offset switching unit 81.

According to the sensitivity switching unit 80 described above, in a case where the temperature measurement value exceeds the threshold temperature T1, the bridge current of the sense circuit 2 is set to small so as to switch the temperature characteristics of the sensitivity of the sense circuit 2.

Figure 4:
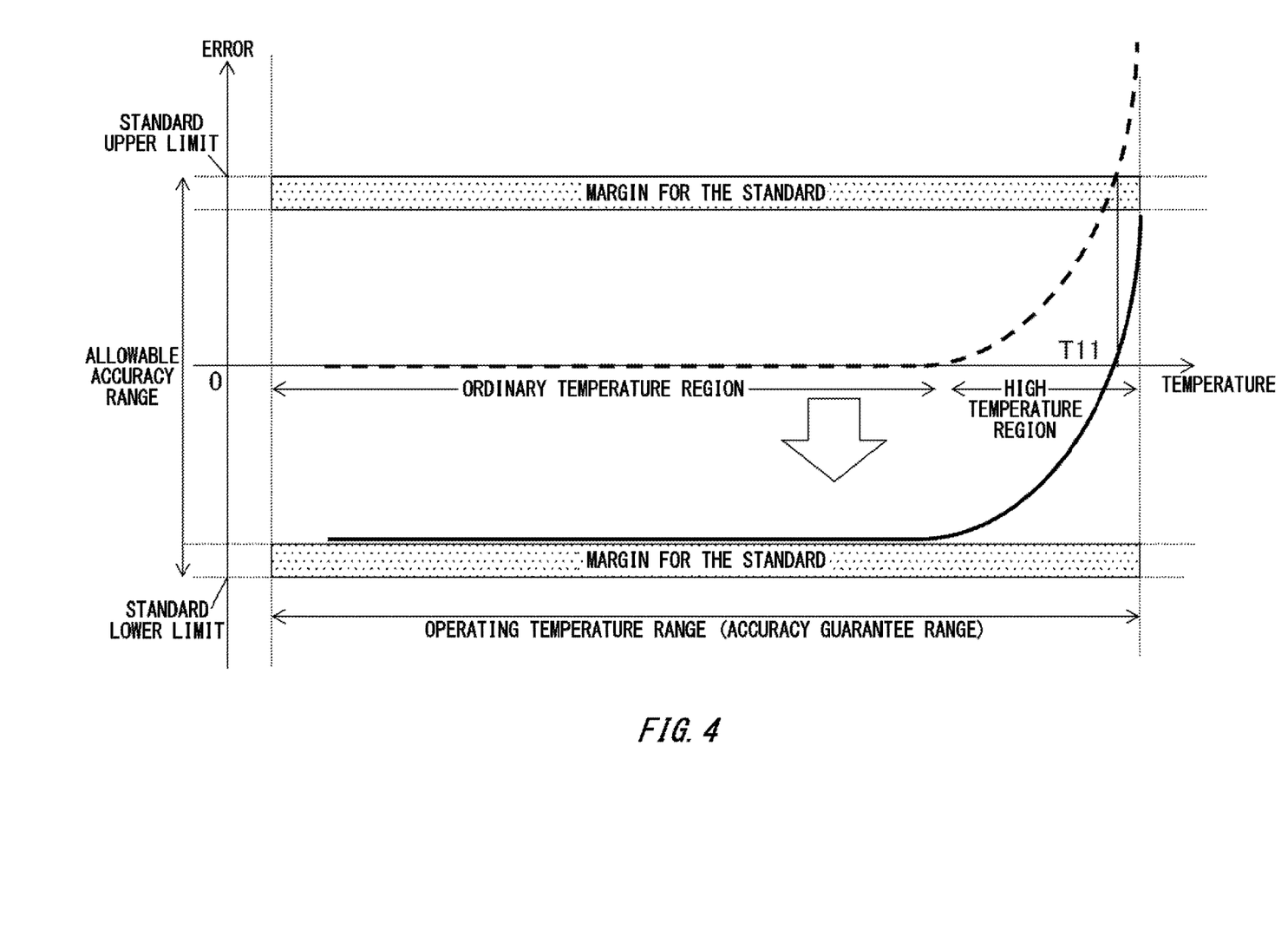
FIG. 4 shows an example of offset setting by the offset setting unit.

[4. Operation Example] [4-1. Offset Setting] FIG. 4 illustrates an example of an offset setting by the offset setting unit 7. In the drawing, the horizontal axis represents a temperature, and the vertical axis represents an error in output signal depending on the temperature characteristics. In addition, a operating temperature range is a temperature range in which the sensor device 1 can be used, and is a temperature range where a measurement error should fall within the standard upper and lower limits. As an example, the operating temperature range may be 5 to 150° C.

The offset setting unit 7 sets the reference voltage of the offset voltage according to the fixed setting parameters (n1) and (n2) which are stored in the memory unit 5. Herein, in a case where the setting parameters (n1) and (n2) are not appropriately set such as a case where the sensor device 1 is in process of manufacturing, the error in the output signal becomes almost 0 in an ordinary temperature region as illustrated in a broken line graph as an example. However, at a high temperature region, the error is increased non-linearly due to an increase of a leak current, and may exceed the standard upper limit at Temperature T11. With this regard, if the setting parameters (n1) and (n2) are appropriately set to adjust the offset, the error is shifted toward the standard lower limit as illustrated in the solid graph as an example. As a result, the error falls between the standard upper limit and the standard lower limit over the entire operating temperature range. However, as illustrated by shadowing in the drawing, the margins for the standard upper limit and the standard lower limit of the error are small.

Figure 5:
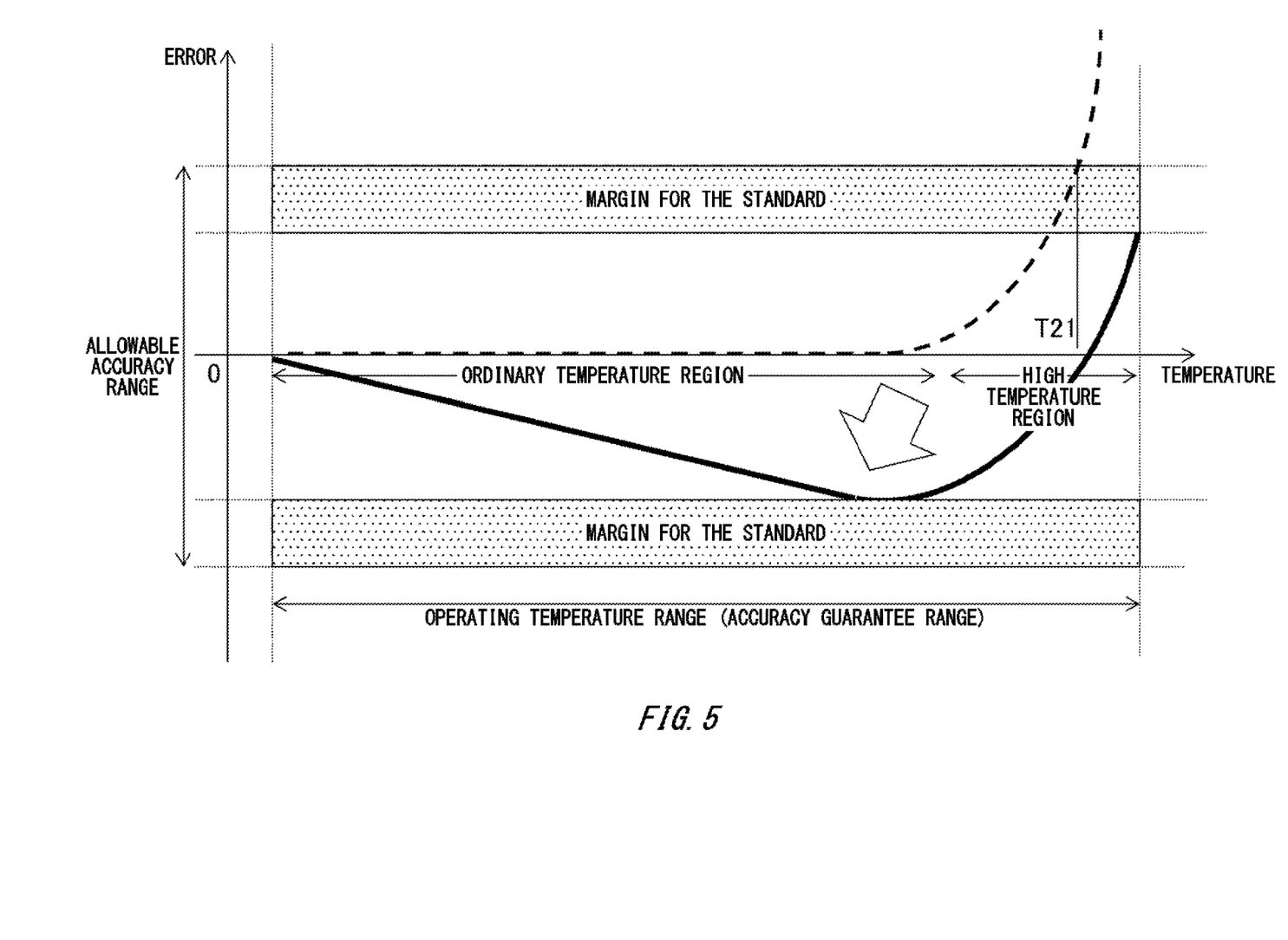
FIG. 5 shows an example of sensitivity setting by the sensitivity setting unit.

[4-2. Sensitivity Setting] FIG. 5 illustrates an example of sensitivity setting by the sensitivity setting unit 6. In the drawing, the horizontal axis represents a temperature, and the vertical axis represents an error in output signal depending on the temperature characteristics.

The sensitivity setting unit 6 sets the reference current of the bridge current according to the fixed setting parameters (m1) and (m2) which are stored in the memory unit 5. In a case where the setting parameters (m1) and (m2) are not appropriately set such as a case where the sensor device 1 is in process of manufacturing, the error in the output signal becomes almost 0 in an ordinary temperature region as illustrated in a broken line graph as an example. However, at a high temperature region, the error is increased non-linearly due to an increase of the leak current, and may exceed the standard upper limit at Temperature T21. With this regard, if the setting parameters (m1) and (m2) are appropriately set to adjust the sensitivity, an inclination of the temperature characteristics of the error is changed as illustrated in the solid graph as an example. As a result, the error falls between the standard upper limit and the standard lower limit over the entire operating temperature range. However, as illustrated by shadowing in the drawing, the margins for the standard upper limit and the standard lower limit of an error are small.

Figure 6:
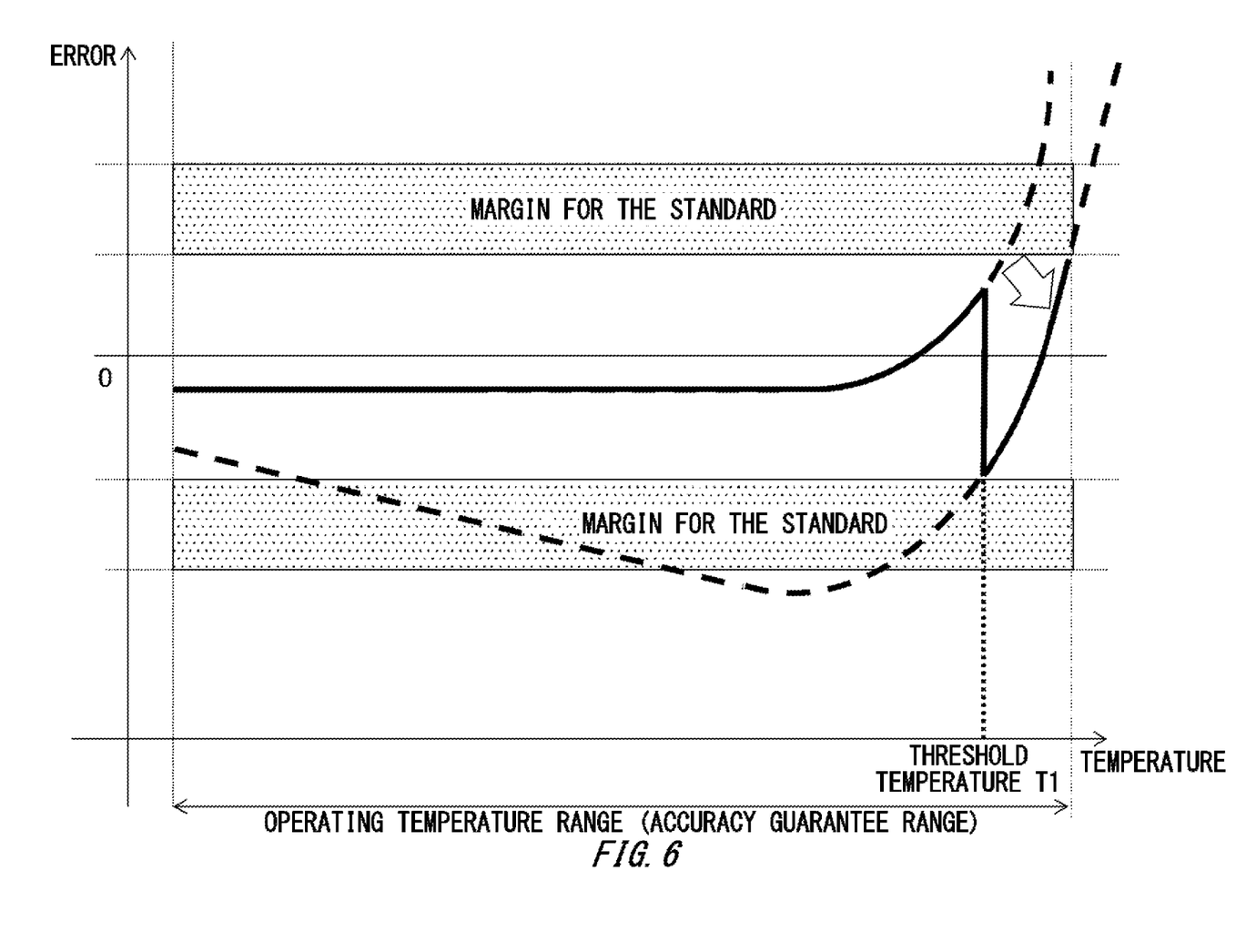
FIG. 6 shows an example of switching sensitivity and offset by a switching unit.

[4-3. Switching of Sensitivity and Offset] FIG. 6 illustrates an example of switching the sensitivity and the offset by the switching unit 8. In the drawing, the horizontal axis represents a temperature, and the vertical axis represents an error in output signal depending on the temperature characteristics. In this embodiment, as an example, in a case where the temperature measurement value exceeds the threshold temperature T1, the switching unit 8 switches the sensitivity of the sense circuit 2 discontinuously by changing the bridge current from the reference current, and switches the offset of the amplifier circuit 3 discontinuously by changing the offset voltage from the reference voltage. With this configuration, as a switching result of the temperature characteristics of the sensor device 1 with the threshold temperature T1 as a boundary, a value region of the error over the entire operating temperature range is narrow compared to FIGS. 4 and 5, and the margins for the standard upper limit and the standard lower limit of the error are increased.

Figure 7:
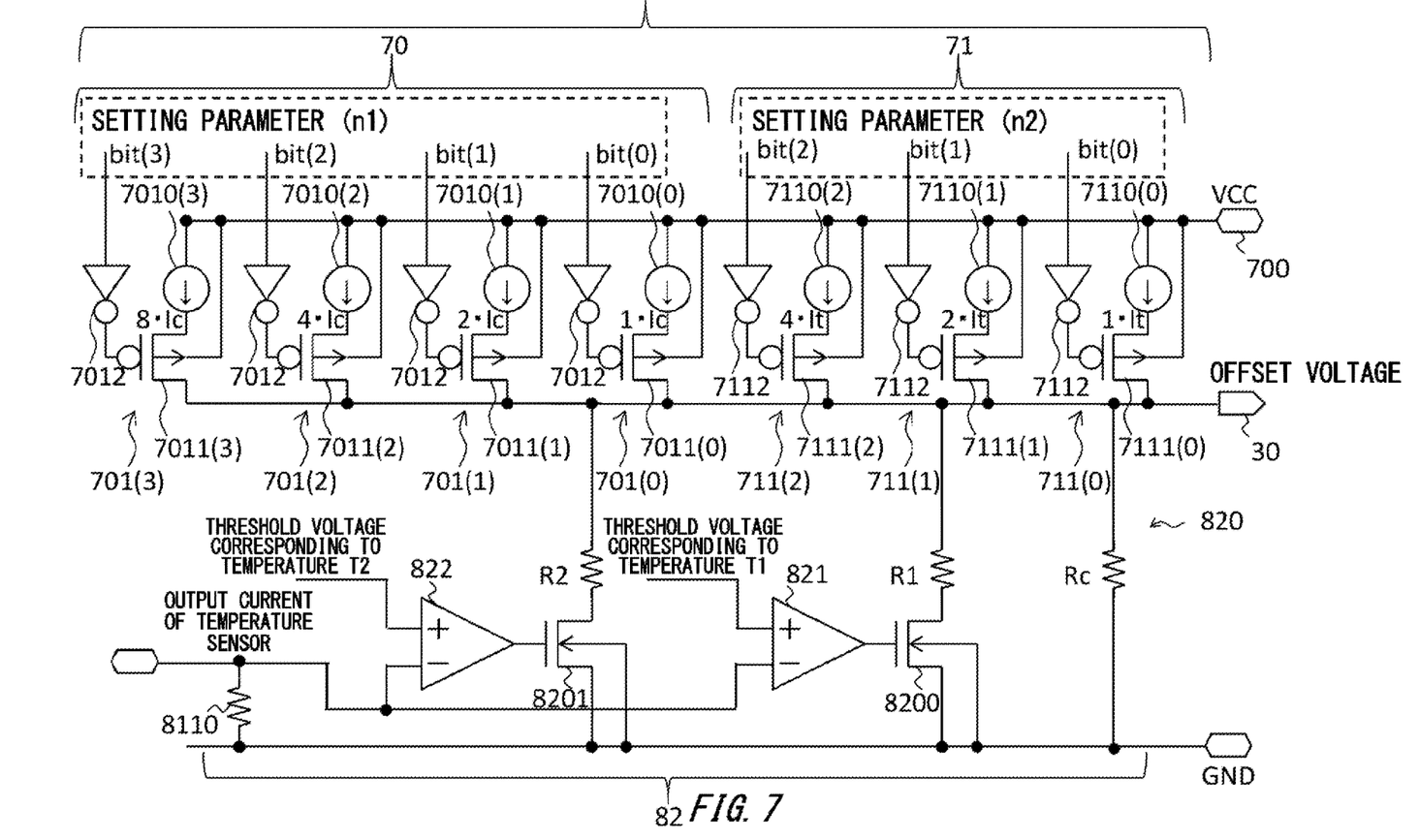
FIG. 7 shows an offset switching unit according to a modification.

[5. Modifications] FIG. 7 illustrates an offset switching unit 82 according to a modification. The switching unit 8 may include the offset switching unit 82 instead of the offset switching unit 81 in the embodiment.

The offset switching unit 82 includes a variable resistor 820 which is connected between the offset voltage input terminal 30 and the ground, and comparators 821 and 822 which compare the temperature measurement value and a plurality threshold temperature (two threshold temperatures T1 and T2 as an example in this modification). For example, the threshold temperatures T1 and T2 may satisfy T1<T2, the threshold temperature T1 may 100° C., and the threshold temperature T2 may be 120° C.

The variable resistor 820 includes the plurality of resistors R (three resistors Rc, R1, and R2 as an example in this modification) which are connected in parallel between the offset voltage input terminal 30 and the ground, and switches 8200 and 8201 which block the current flowing to any of the resistors R (the resistors R1 and R2 in this modification). With this configuration, a resistance value of the variable resistor 820 is Rc in a case where the switches 8200 and 8201 are opened, (Rc·R1)/(Rc+R1) in a case where the switch 8200 is closed, and (Rc·R1·R2)/(R1·R2+Rc·R2+Rc·R1) in a case where the switches 8200 and 8201 are closed. The resistance value (Rc·R1·R2)/(R1·R2+Rc·R2+Rc·R1) may be smaller than the resistance value (Rc/R1)/(Rc+R1). The switch 8200 may be opened or closed according to an output signal from the comparator 821, and the switch 8201 may be opened or closed according to an output signal from the comparator 822. With this configuration, the resistance value of the variable resistor 820 is switched in a stepped manner according to the comparison results of the comparators 821 and 822. The switches 8200 and 8201 may be MOSFETs.

Each of the comparators 821 and 822 may compare a voltage corresponding to the temperature measurement value and the voltages corresponding to the threshold temperatures T1 and T2. With this configuration, in a case where the temperature measurement value does not exceed any of the threshold temperatures T1 and T2, the switches 8200 and 8201 are opened. In a case where the temperature measurement value exceeds the threshold temperature T1, the switch 8200 is closed. In a case where the temperature measurement value exceeds the threshold temperature T2, the switches 8200 and 8201 are closed. As a result, the voltage to be supplied to the offset voltage input terminal 30 is reduced in a stepped manner according to whether the temperature measurement value exceeds any of two threshold temperatures T1 and T2, so that the offset is switched in a stepped manner.

Further, the description in the modification has been given about that the offset switching unit 82 switching the offset in a stepped manner is provided with the switching unit 8. In addition to/alternatively, the sensitivity switching unit 80 switching the sensitivity in a stepped manner may be provided with the switching unit 8. Such a sensitivity switching unit 80 may switch the sensitivity in a stepped manner according to whether the temperature measurement value exceeds any of a plurality of threshold temperatures in a manner similar to the offset switching unit 82.

Figure 8:
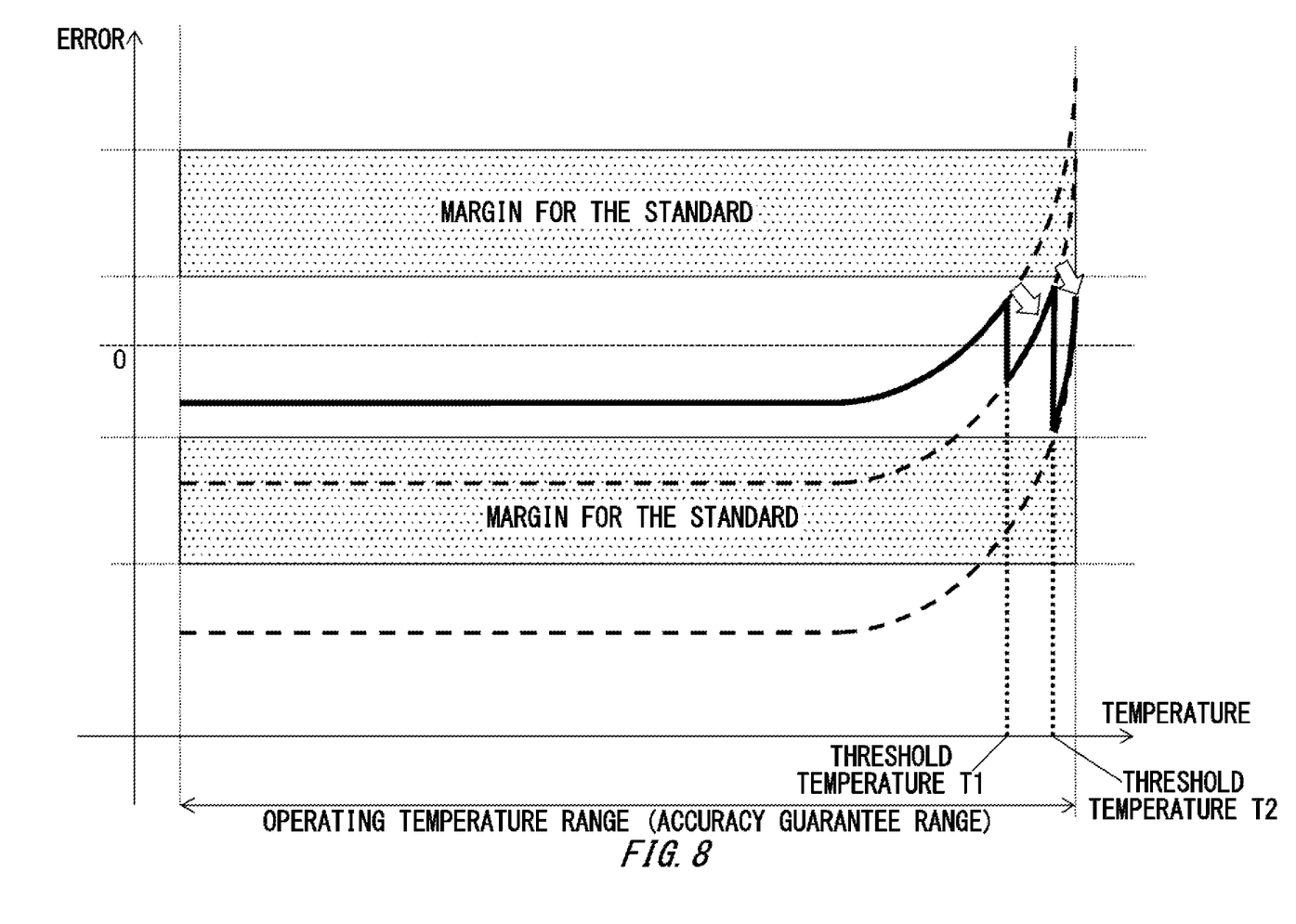
FIG. 8 shows an example of switching of the offset by the offset switching unit.

[5-1. Operation Example of Modification] FIG. 8 illustrates an example of switching the offset by the offset switching unit 82. In the drawing, the horizontal axis represents a temperature, and the vertical axis represents an error in output signal depending on the temperature characteristics. As an example in this modification, in a case where the temperature measurement value exceeds the threshold temperatures T1 and T2, the offset switching unit 8 changes the offset voltage from the reference voltage in a stepped manner so as to switch the offset of the amplifier circuit 3 in a discontinuous and stepped manner. With this configuration, as a switching result of the temperature characteristics of the sensor device 1 with the threshold temperatures T1 and T2 as boundaries, a value region of the error over the entire operating temperature range is narrow compared to FIG. 6, and the margins for the standard upper limit and the standard lower limit of the error are increased.

[6. Other Modifications] While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

For example, the description has been given about that the sensitivity switching unit 80 and the offset switching unit 81 use the same threshold temperature T1, but may use different threshold temperatures.

In addition, the sensitivity switching unit 80 has been described to include a sink type of the current source 800 which is connected between the sense circuit 2 and the ground, but may include a source type of the current source which is connected between the power source 600 and the sense circuit 2. In this case, the switch 801 of the sensitivity switching unit 80 may be closed in a case where the temperature measurement value does not exceed the threshold temperature, and may be opened in a case where the temperature measurement value exceeds the threshold temperature. With this configuration, in a manner similar to the above-described embodiments, in a case where the temperature measurement value exceeds the threshold temperature, the bridge current becomes smaller than that in a case where the temperature measurement value does not exceed the threshold temperature. The sensitivity of the sense circuit 2 is lowered.

In addition, the sensor device 1 has been described to include the temperature sensor 4, the memory unit 5, the sensitivity setting unit 6, and the offset setting unit 7, but any of these may be omitted. For example, in a case where the sensor device 1 does not provided the temperature sensor 4, the temperature of the sense circuit 2 may be acquired from an external temperature sensor. In addition, in a case where the memory unit 5 is not provided, the sensor device 1 may is provided such that the opening/closing of the switches of the sensitivity setting unit 6 and/or the offset setting unit 7 may be set by default.

In addition, the switching unit 8 has been described about that the sensitivity and/or the offset is switched in a case where the temperature measurement value exceeds the threshold temperature, but the switching may be performed in a case where the temperature measurement value is less than the threshold temperature (as an example, 0° C.). In addition, the sense circuit 2 has been described to detect a pressure magnitude as a physical quantity, but other physical quantities such as acceleration may be detected.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 1 sensor device, 2 sense circuit, 3 amplifier circuit, 4 temperature sensor, 5 memory unit, 6 sensitivity setting unit, 7 offset setting unit, 8 switching unit, 20 Wheatstone bridge, 21 piezo resistor, 22 piezo resistor, 23 piezo resistor, 24 piezo resistor, 30 offset voltage input terminal, 60 reference sensitivity setting unit, 61 temperature sensitivity setting unit, 70 reference offset setting unit, 71 temperature offset setting unit, 80 sensitivity switching unit, 81 offset switching unit, 82 offset switching unit, 600 power source, 601 current supply unit, 611 current supply unit, 700 power source, 701 current supply unit, 711 current supply unit, 800 current source, 801 switch, 802 comparator, 810 variable resistor, 811 comparator, 820 variable resistor, 821 comparator, 822 comparator, 6010 current source, 6011 switch, 6012 buffer circuit, 6110 current source, 6111 switch, 6112 buffer circuit, 7010 current source, 7011 switch, 7012 buffer circuit, 7110 current source, 7111 switch, 7112 buffer circuit, 8100 switch, 8110 resistor, 8000 switch, 8020 resistor, 8200 switch, 8201 switch.

What is claimed is:

1. A sensor device, comprising:
   a sense circuit which outputs a sense signal corresponding to a magnitude of a detected physical quantity;
   an amplifier circuit which amplifies the sense signal; and
   a switching unit which switches at least one of a sensitivity of the sense circuit and an offset of the amplifier circuit discontinuously according to whether a temperature measurement value exceeds a threshold value,
   wherein the amplifier circuit includes an offset voltage input terminal to adjust the offset, and
   wherein the switching unit includes an offset switching unit which switches a voltage to be supplied to the offset voltage input terminal.

2. The sensor device according to claim 1,
   wherein the offset switching unit includes
   a variable resistor which is connected between the offset voltage input terminal and a reference potential, and
   a comparator which compares the temperature measurement value and the threshold value, and
   wherein the offset switching unit switches a resistance value of the variable resistor according to a comparison result of the comparator.

3. The sensor device according to claim 2,
   wherein the variable resistor includes
   a plurality of resistors which is connected in parallel between the offset voltage input terminal and the reference potential, and
   a switch which blocks a current flowing to any of the plurality of resistors.

4. The sensor device according to claim 2,
   wherein the offset switching unit makes the resistance value of the variable resistor lower in a case where the temperature measurement value exceeds the threshold value than in a case where the temperature measurement value does not exceed the threshold value.

5. The sensor device according to claim 1,
   wherein the offset switching unit makes a voltage to be supplied to the offset voltage input terminal lower in a case where the temperature measurement value exceeds the threshold value than in a case where the temperature measurement value does not exceed the threshold value.

6. The sensor device according to claim 1, further comprising:
   an offset setting unit which sets a reference voltage to be supplied to the offset voltage input terminal,
   wherein the offset switching unit changes a voltage to be supplied to the offset voltage input terminal from the reference voltage according to whether the temperature measurement value exceeds the threshold value.

7. The sensor device according to claim 6,
   wherein the offset setting unit includes a temperature offset setting unit which sets the reference voltage according to a fixed setting parameter, and
   wherein the temperature offset setting unit changes the reference voltage continuously according to the temperature measurement value.

8. The sensor device according to claim 1, further comprising:
   an offset setting unit which sets a voltage to be supplied to the offset voltage input terminal,
   wherein the offset setting unit includes a temperature offset setting unit which sets the voltage according to a fixed setting parameter, and changes the voltage continuously according to a temperature change.

9. The sensor device according to claim 1, further comprising:
   an offset setting unit which sets a voltage to be supplied to the offset voltage input terminal,
   wherein the offset setting unit includes
   a first offset setting unit which supplies part of the voltage constantly according to a fixed setting parameter regardless of a temperature change, and
   a second offset setting unit which changes other part of the voltage according to a fixed setting parameter continuously depending on the temperature change, and supplies the other part of the voltage.

10. The sensor device according to claim 1,
    wherein the switching unit switches at least one of the sensitivity and the offset in a stepped manner according to whether the temperature measurement value exceeds any of a plurality of threshold values.

11. The sensor device according to claim 1, further comprising:
a temperature sensor which measures a temperature of the sense circuit as the temperature measurement value.

12. A sensor device, comprising:
a sense circuit which outputs a sense signal corresponding to a magnitude of a detected physical quantity;
an amplifier circuit which amplifies the sense signal; and
a switching unit which switches at least one of a sensitivity of the sense circuit and an offset of the amplifier circuit discontinuously according to whether a temperature measurement value exceeds a threshold value,
wherein the sensitivity of the sense circuit is adjustable according to a current supplied thereto, and
wherein the switching unit includes a sensitivity switching unit which switches the current to be supplied to the sense circuit.

13. The sensor device according to claim 12,
wherein the sensitivity switching unit includes
a current source which is connected to the sense circuit,
a comparator which compares the temperature measurement value and the threshold value, and
a switch which blocks a current flowing between the current source and the sense circuit according to a comparison result of the comparator.

14. The sensor device according to claim 12,
wherein the sensitivity switching unit makes a current to be supplied to the sense circuit lower in a case where the temperature measurement value exceeds the threshold value than in a case where the temperature measurement value does not exceed the threshold value.

15. The sensor device according to claim 12, further comprising:
a sensitivity setting unit which sets a reference current to be supplied to the sense circuit,
wherein the sensitivity switching unit changes a current to be supplied to the sense circuit from the reference current according to whether the temperature measurement value exceeds the threshold value.

16. The sensor device according to claim 15,
wherein the sensitivity setting unit includes a temperature sensitivity setting unit which sets the reference current according to a fixed setting parameter, and
wherein the temperature sensitivity setting unit changes the reference current continuously according to the temperature measurement value.

17. The sensor device according to claim 12, further comprising:
a sensitivity setting unit which sets a current to be supplied to the sense circuit,
wherein the sensitivity setting unit includes a temperature sensitivity setting unit which sets the current according to a fixed setting parameter, and changes the current continuously according to a temperature change.

18. The sensor device according to claim 12, further comprising:
a sensitivity setting unit which sets the current,
wherein the sensitivity setting unit includes
a first sensitivity setting unit which supplies part of the current constantly according to a fixed setting parameter regardless of a temperature change, and
a second sensitivity setting unit which changes other part of the current according to a fixed setting parameter continuously depending on the temperature change, and supplies the other part of the current.

19. The sensor device according to claim 12,
wherein the switching unit switches at least one of the sensitivity and the offset in a stepped manner according to whether the temperature measurement value exceeds any of a plurality of threshold values.

20. The sensor device according to claim 12, further comprising:
a temperature sensor which measures a temperature of the sense circuit as the temperature measurement value.

* * * * *